(12) United States Patent
Huh

(10) Patent No.: US 10,336,313 B2
(45) Date of Patent: Jul. 2, 2019

(54) VEHICLE AND CONTROL METHOD THEREOF

(71) Applicants: Hyundai Motor Company, Seoul (KR); Kia Motors Corporation, Seoul (KR)

(72) Inventor: Jeong Ki Huh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 228 days.

(21) Appl. No.: 15/237,805

(22) Filed: Aug. 16, 2016

(65) Prior Publication Data

US 2017/0274893 A1    Sep. 28, 2017

(30) Foreign Application Priority Data

Mar. 25, 2016 (KR) .................. 10-2016-0035762

(51) Int. Cl.
| | | |
|---|---|---|
| *F01N 3/20* | (2006.01) | |
| *F01N 3/28* | (2006.01) | |
| *B60W 10/06* | (2006.01) | |
| *B60W 10/08* | (2006.01) | |
| *B60W 20/16* | (2016.01) | |

(Continued)

(52) U.S. Cl.
CPC ............ *B60W 20/16* (2016.01); *B60W 10/06* (2013.01); *B60W 10/08* (2013.01); *F01N 3/20* (2013.01); *F01N 3/2842* (2013.01); *F02D 41/0235* (2013.01); *F02D 41/042* (2013.01); *F02D 41/065* (2013.01); *F02D 41/1454* (2013.01); *F02D 41/22* (2013.01); *B60W 2530/12* (2013.01); *B60W 2710/0694* (2013.01); *Y10S 903/902* (2013.01)

(58) Field of Classification Search
CPC ...... B60W 10/06; B60W 10/08; B60W 20/16; B60W 2530/12; B60W 2710/0694; F01N 3/20; F01N 3/2842; F02D 41/0235; F02D 41/042; F02D 41/065; F02D 41/1454; F02D 41/22; Y10S 903/902
See application file for complete search history.

(56) References Cited

U.S. PATENT DOCUMENTS

| | | | |
|---|---|---|---|
| 2010/0055004 A1* | 3/2010 | Olson | F01N 3/2857 422/177 |
| 2014/0107909 A1* | 4/2014 | Genko | F02D 41/123 701/108 |

FOREIGN PATENT DOCUMENTS

| | | |
|---|---|---|
| JP | H06-307271 A | 11/1994 |
| JP | 2010019186 A | 1/2010 |

(Continued)

OTHER PUBLICATIONS

Notice of Allowance from Korean Intellectual Property Office for Korean Patent Application No. 10-2016-0035762, dated Dec. 8, 2017, English abstract.

*Primary Examiner* — Brandon D Lee
(74) *Attorney, Agent, or Firm* — Mintz Levin Cohn Ferris Glovsky and Popeo, P.C.; Peter F. Corless

(57) ABSTRACT

A vehicle and a control method thereof are provided. The vehicle includes an engine, a catalytic converter including catalyst for purifying exhaust gas discharged from the engine and a sensing unit that is disposed between the engine and the catalytic converter. The sensing unit outputs an electrical signal in response to sensing of gas and a controller starts the engine based on the electrical signal output from the sensing unit and a mileage of the vehicle.

12 Claims, 11 Drawing Sheets

(51) Int. Cl.
*F02D 41/02* (2006.01)
*F02D 41/04* (2006.01)
*F02D 41/06* (2006.01)
*F02D 41/14* (2006.01)
*F02D 41/22* (2006.01)

(56) References Cited

FOREIGN PATENT DOCUMENTS

| | | | |
|---|---|---|---|
| JP | 2010-083232 | A | 4/2010 |
| JP | 2011144751 | A | 7/2011 |
| KR | 970001438 | B1 | 2/1997 |
| KR | 100747926 | B1 | 8/2007 |
| KR | 10-2010-0044531 | A | 4/2010 |
| KR | 2013-0034457 | A | 4/2013 |
| KR | 10-1393800 | B1 | 5/2014 |

\* cited by examiner

VEHICLE AND CONTROL METHOD THEREOF

CROSS-REFERENCE TO RELATED APPLICATION

This application claims the benefit of Korean Patent Application No. 10-2016-0035762, filed on Mar. 25, 2016 in the Korean Intellectual Property Office, the disclosure of which is incorporated herein by reference.

BACKGROUND

1. Field of Disclosure

The present disclosure relates to a vehicle and a control method thereof, and more particularly, to a vehicle having an oxygen sensor that senses gas generated by high temperature in a catalytic convert to prevent error generation.

2. Description of the Related Art

Generally, vehicles travel on roads or rails using a driving force acquired by an engine, etc. that burns fossil fuels such as gasoline or diesel to acquire thermal energy and converts the thermal energy into mechanical energy. Recently, vehicles that acquire a driving force using electrical energy charged in an internal battery, instead of burning fossil fuels, have been developed. Such vehicles of acquiring a driving force using electrical energy are referred to as electric vehicles.

The electric vehicles include a general electric vehicle (EV) that acquires a driving force using electrical energy, a hybrid electric vehicle (HEV) that acquires a driving force using both thermal energy according to the combustion of fossil fuels and electrical energy, and a plug-in hybrid electric vehicle (PHEV) that uses both thermal energy according to the combustion of fossil fuels and electrical energy by receiving electrical energy from the outside and charging the electrical energy in an internal battery.

SUMMARY

An aspect of the present disclosure provides a vehicle in which a front oxygen sensor installed in front of a catalytic converter senses gas generated by high temperature in the catalytic converter to prevent or minimize the generation of errors, and a method of controlling the vehicle. Additional aspects of the disclosure will be set forth in part in the description which follows and, in part, will be obvious from the description, or may be learned by practice of the disclosure.

In accordance with one aspect of the present disclosure, a vehicle may include an engine, a catalytic converter having catalyst for purifying exhaust gas discharged from the engine, a sensing unit disposed between the engine and the catalytic converter and configured to output an electrical signal in response to sensing of gas and a controller configured to start the engine based on the electrical signal output from the sensing unit and a mileage of the vehicle.

The catalytic converter may include a support member configured to support the catalyst, and the support member may include an organic binder that emits combustion gas due to heat. The engine may be started based on a control signal received from the controller, discharges the exhaust gas, and transfers the exhaust gas to the catalytic converter, and the combustion gas generated in the catalytic converter is emitted to the outside by the exhaust gas. The gas sensed by the sensing unit may include at least one gas of the exhaust gas discharged from the engine and the combustion gas emitted from the organic binder.

When the electrical signal output from the sensing unit is equal to or less than a first threshold value, and the mileage of the vehicle is less than a second threshold value, the controller may be configured to transfer a driving signal to the engine to start the engine. When the electrical signal output from the sensing unit is greater than the first threshold value, or when the mileage of the vehicle is greater than the second threshold value, after the engine starts operating, the controller may be configured to stop the engine. When the electrical signal output from the sensing unit is greater than the first threshold value, or when the mileage of the vehicle is greater than the second threshold value, the controller may be configured to stop the engine after a predetermined time period elapses.

Additionally, when the electrical signal output from the sensing unit is greater than the first threshold value, or when the mileage of the vehicle is greater than the second threshold value, the controller may be configured to decrease an engine driving request time, and stop the engine when the engine driving request time is equal to or less than zero. When the electrical signal output from the sensing unit is less than a third threshold value, the controller may be configured to determine an error generation, wherein the third threshold value may be less than the first threshold value. The vehicle may further include a motor configured to acquire a driving force of the vehicle from electrical energy. When the motor operates, the engine may stop, and when the engine operates, the motor may stop.

A method of controlling a vehicle may include starting operation of a motor, and stopping an engine, at a catalytic converter for purifying exhaust gas discharged from the engine, emitting combustion gas, outputting an electrical signal in response to sensing of the combustion gas and resuming operation of the engine based on the electrical signal and a mileage of the vehicle.

The resuming of the operation of the engine based on the electrical signal and the mileage of the vehicle may include starting the operation of the engine based on a control signal received from the controller, discharging the exhaust gas, and transferring the exhaust gas to the catalytic converter to emit the combustion gas generated in the catalytic converter to the outside by the exhaust gas. The sensing unit may be configured to sense at least one gas of the exhaust gas discharged from the engine and the combustion gas emitted from an organic binder.

Further, the resuming of the operation of the engine based on the electrical signal and the mileage of the vehicle may include transferring a control signal to the engine to start the engine when the electrical signal output from the sensing unit is equal to or less than a first threshold value and the mileage of the vehicle is less than a second threshold value.

The method may further include stopping the engine when the electrical signal output from the sensing unit is greater than the first threshold value, or when the mileage of the vehicle is greater than the second threshold value, after the engine starts operating. The stopping of the engine when the electrical signal output from the sensing unit is greater than the first threshold value or when the mileage of the vehicle is greater than the second threshold value after the engine starts operating may include stopping transferring a driving signal to the engine after a predetermined time period elapses.

The stopping of the engine when the electrical signal output from the sensing unit is greater than the first threshold value or when the mileage of the vehicle is greater than the second threshold value after the engine starts operating may further include decreasing an engine driving request time when the electrical signal output from the sensing unit is greater than a first threshold or when the mileage of the vehicle is greater than the second threshold, and stopping transferring a driving signal to the engine if when engine driving request time is equal to or less than zero.

The method may further include determining an error generation when the electrical signal output from the sensing unit is less than a third threshold value, wherein the third threshold value may be less than the first threshold value. The catalytic converter may include catalyst configured to reduce a harmful material from the exhaust gas discharged from the engine, an organic binder, and a support member for supporting the catalyst, wherein the organic binder may be configured to emit the combustion gas at high temperature.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
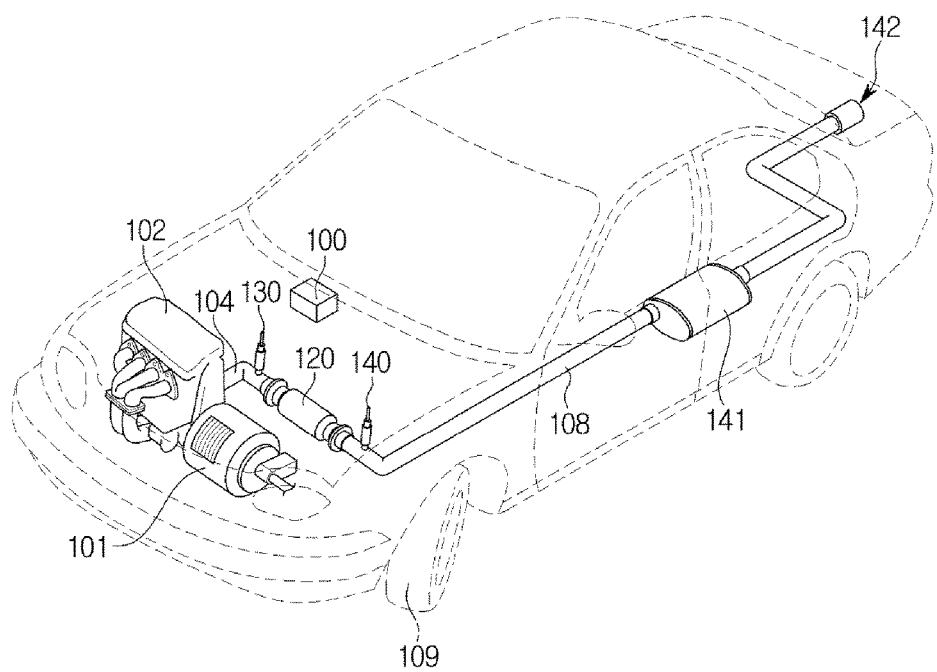
FIG. 1 is a perspective view of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an exemplary embodiment of the present disclosure will be descried with reference to FIGS. 1 to 10.

A vehicle which will be described below may be a general vehicle which acquires a driving force for wheels using thermal energy generated according to the combustion of fossil fuels such as gasoline or diesel, or an electric vehicle which acquires a driving force for wheels using electrical energy. The electric vehicle may be a general electric vehicle (EV), a hybrid electric vehicle (HEV), or a plug-in hybrid electric vehicle (PHEV). Additionally, the vehicle may be an idle stop and go (ISG) vehicle. The ISG vehicle may be operated to automatically stop driving the engine when the vehicle is stopped and an engine stop condition is satisfied, and to again drive the engine when an engine driving condition is satisfied. Herein, the engine stop condition may be, for example, when a predetermined time period elapses after the vehicle stops, and the engine driving condition may be, for example, when a manipulation signal of an accelerator pedal is generated or when no manipulation signal of a brake pedal is generated.

Figure 2:
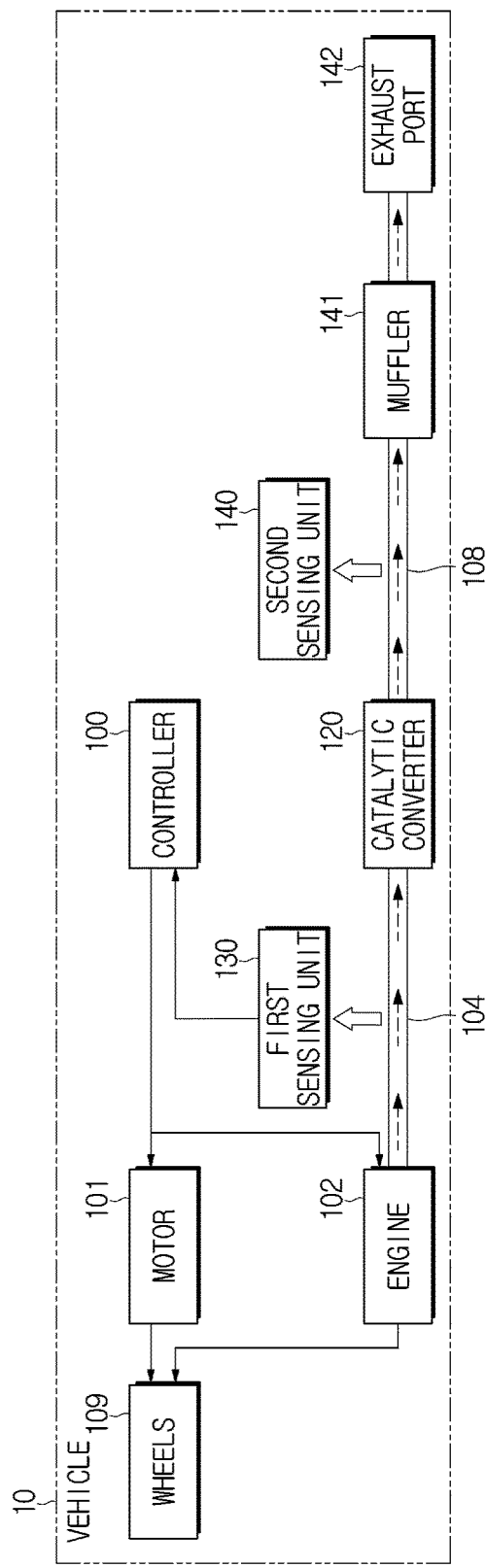
FIG. 2 is a block diagram of a vehicle according to an exemplary embodiment of the present disclosure.

FIG. 1 is a perspective view of a vehicle according to an exemplary embodiment of the present disclosure, and FIG. 2 is a block diagram of a vehicle according to an exemplary embodiment of the present disclosure. Referring to FIGS. 1 and 2, a vehicle 10 may include a motor 101 configured to transfer torque to wheels 109 using electrical energy, an engine 102 configured to transfer torque to the wheels 109 using combustion energy of fossil fuels, and a controller 100 configured to execute operations of at least one of the motor 101 and the engine 102.

The controller 100 may be configured to execute overall operations of the vehicle 10. For example, the controller 100 may be configured to transfer a control signal to at least one of the motor 101 and the engine 102 to perform a predetermined operation based on the control signal. More specifically, the controller 100 may be configured to transfer a control signal to the motor 101 to operate the motor 101 to convert electrical energy into mechanical energy to generate torque for the wheels 109. Additionally, the controller 100 may be configured to execute driving of the engine 102. For example, the controller 100 may be configured to transfer a control signal to an injector (not shown) installed in the engine 102 for the injector to inject fuels, or the controller 100 may be configured to transfer a control signal to an ignition coil (not shown) for the ignition coil to cause ignition at an ignition plug (not shown) at an appropriate time. According to an exemplary embodiment, the controller 100 may be configured to stop operation of the motor 101 or the engine 102 when at least one of the motor 101 and the engine 102 operates (e.g., stop operation of the one that is not operating). The controller 100 may further be configured to transfer control signals for operating various types of components (e.g., a transmission) installed within the vehicle 10 to execute operations of the various types of components installed within the vehicle 10.

The controller 100 may be implemented using an electronic control unit installed within the vehicle 10 and that may be configured with at least one semiconductor chip, related components, a board, etc. The motor 101 and the engine 102 may provide a driving force to the wheels 109 of the vehicle 10, individually, and the motor 101 and the engine 102 may be operated based on control signals transferred from the controller 100. In a general vehicle or an ISG vehicle that is driven only by the engine 102, the motor 101 may be not installed.

Additionally, the vehicle 10 may include a first exhaust pipe 104 through which exhaust gas generated from the engine 102 may be transferred, a first sensing unit 130 disposed in the first exhaust pipe 104 and configured to collect information regarding exhaust gas g1 passing through the first exhaust pipe 104 and to output an electrical signal corresponding to the collected information to the controller 100, a catalytic converter 120 connected to one end of the first exhaust pipe 104 and configured to purify the exhaust gas g1, a second exhaust pipe 108 having one end connected to the catalytic converter 120, and configured to transfer exhaust gas g2 purified by the catalytic converter 120, and an exhaust port 142 configured to emit the exhaust gas g2 discharged through the second exhaust pipe 108 to the outside. The first sensing unit 130 may include a front oxygen sensor.

Furthermore, according to an exemplary embodiment, the vehicle 10 may further include a second sensing unit 140 configured to collect information regarding the purified exhaust gas g2 passing through the second exhaust pipe 108 and to output an electrical signal that corresponds to the collected information to the controller 100. The second sensing unit 140 may be configured to determine whether the exhaust gas g2 passed through the catalytic converter 120 was appropriately purified. The second sensing unit 140 may include a rear oxygen sensor. Additionally, the vehicle 10 may include a muffler device 141 disposed between the second exhaust pipe 108 and the exhaust port 142, and configured to reduce noise of the exhaust gas g2 passed through the catalytic converter 120 and being transferred to the exhaust port 142. The exhaust gas g2 passed through the muffler device 141 may be emitted to the outside of the vehicle 10 through the exhaust port 142.

Figure 3:
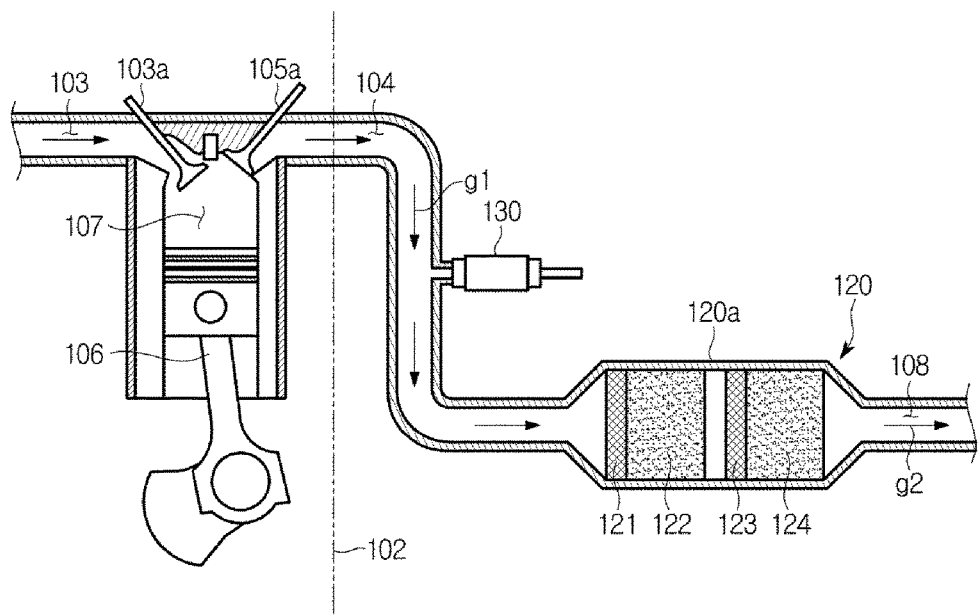
FIG. 3 is a cross-sectional view of the engine, the first sensing unit and the catalytic converter according to an exemplary embodiment of the present disclosure.
Figure 4:
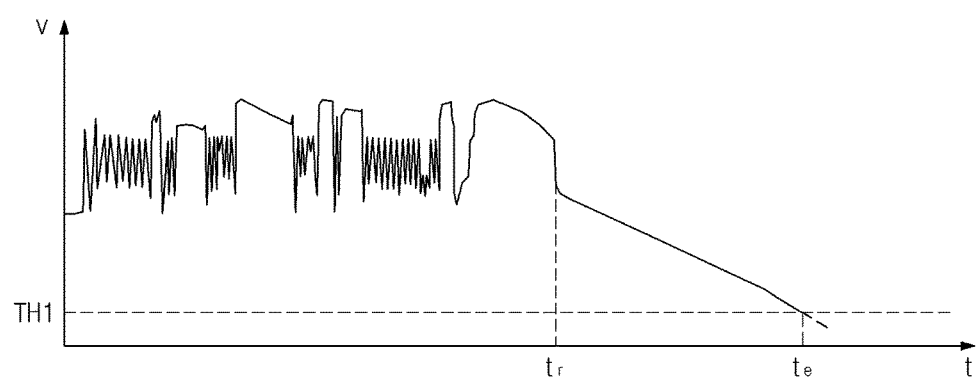
FIG. 4 is a signal diagram showing an example of changes of an electrical signal output from the first sensing unit according to an exemplary embodiment of the present disclosure.

Hereinafter, structures and operations of the engine 102, the first sensing unit 130, and the catalytic converter 120 will be described in more detail. FIG. 3 is a cross-sectional view of the engine 102, the first sensing unit 130, and the catalytic converter 120, and FIG. 4 is a signal diagram showing an example of changes of an electrical signal output from the first sensing unit 130.

Referring to FIG. 3, according to an exemplary embodiment, the engine 102 may include an inlet pipe 103 configured to transfer mixed gas of air and fuels to a combustion chamber 107, an inlet valve 103a configured to open or close to form or close an air passage between the inlet pipe 103 and the combustion chamber 107, the combustion chamber 107 in which the mixed air may be exploded and expanded based on an operation of an ignition plug, a piston 106 configured to cause the mixed air to be suctioned into the combustion chamber 107 and to compress the mixed air, and an exhaust valve 105a configured to open or close to discharge the exploded and expanded mixed air in the form of exhaust gas g1 to the first exhaust pipe 104. When the piston 106 is lowered according to combustion of the mixed gas in the combustion chamber 107, a crankshaft mechanically connected to the piston 106 may rotate to acquire energy for driving the vehicle 10. The exhaust gas g1 discharged to the first exhaust pipe 104 may be transferred to the catalytic converter 120, as described above.

When the exhaust gas g1 flows to the catalytic converter 120, the first sensing unit 130 may be configured to sense the exhaust gas g1 and output an electrical signal corresponding to the result of the sensing to the controller 100. More specifically, as shown in FIG. 4, the first sensing unit 130 may be configured to output an electrical signal having a voltage of a magnitude that corresponds to the result of sensing the exhaust gas g1. More specifically, for example, the first sensing unit 130 may be configured to output an electrical signal of a lower voltage in response to sensing a greater amount of the exhaust gas g1, and an electrical signal of a higher voltage in response to sensing a less amount of the exhaust gas g1. According to another exemplary embodiment, the first sensing unit 130 may be configured to output an electrical signal of a higher voltage in response to sensing a greater amount of the exhaust gas g1.

Further, the controller 100 may be configured to analyze the ingredients of the exhaust gas g1 in the first exhaust pipe 104, based on the electrical signal received from the first sensing unit 130. The controller 100 may also be configured to determine whether an error was generated in the engine 102 and/or the first sensing unit 130, and provide the determination result to a driver and/or a passenger (e.g., output a warning to a driver regarding the error or malfunction). For example, when the controller 100 determines that the magnitude (e.g., a voltage) of the electrical signal received from the first sensing unit 130 gradually decreases (e.g., between $t_r$ and $t_e$) to become less than an error determination threshold value TH1 ($t_e$), as show in FIG. 4, the controller 100 may be configured to determine an error generation in the engine 102 and/or the first sensing unit 130. When the controller 100 determines that the voltage of the electrical signal gradually increases to become greater than a predetermined error determination threshold value, the controller 100 may be configured to determine an error generation in the engine 102 and/or the first sensing unit 130.

Additionally, when the controller 100 determines an error generation in the engine 102 and/or the first sensing unit 130, the controller 100 may be configured to transfer a control signal to an instrument panel and/or a display unit mounted within the vehicle 10 for the instrument panel and/or the display unit to output an error signal. More specifically, for example, when the controller 100 determines an error generation in the engine 102 and/or the first sensing unit 130, the controller 100 may be configured to turn on an engine check light installed in the instrument panel, etc. of the vehicle 10. Accordingly, information regarding the error in the engine 102 and/or the first sensing unit 130 may be provided to the driver and/or the passenger.

According to an exemplary embodiment, the catalytic converter 120 may include one or more catalyst substrates 121 and 123 (also referred to as a first catalyst substrate 121 and a second catalyst substrate 123) and one or more support members 122 and 124 (also referred to as a first support member 122 and a second support member 124). The catalyst substrates 121 and 123 and the support members 122 and 124 may be disposed within a housing 120a forming the outer appearance of the catalytic converter 120.

The one or more catalyst substrates 121 and 123 and the one or more support members 122 and 124 may be arranged sequentially, as shown in FIG. 3. For example, the first catalyst substrate 121 may be disposed in a direction in which the exhaust gas g1 enters, the first support member 122 may be disposed in a direction in which the exhaust gas g1 moves from the first catalyst substrate 121, the second catalyst substrate 123 may be disposed in a direction in which the exhaust gas g1 moves from the first support member 122, and the second support member 124 may be disposed in a direction in which the exhaust gas g1 is discharged from the second catalyst substrate 123. In other words, the first catalyst substrate 121, the first support member 122, the second catalyst substrate 123, and the second support member 124 may be arranged sequentially from a direction in which the exhaust gas g1 enters to a direction in which the exhaust gas g1 is discharged. In particular, the first catalyst substrate 121 and the first support member 122 may be in contact with or adjacent to each other, the first support member 122 and the second catalyst substrate 123 may be spaced from each other, and the second catalyst substrate 123 and the second support member 124 may be in contact with or adjacent to each other.

The catalyst substrates 121 and 123 may be in the shape of a net, a honeycomb, or a sphere and at least one layer of active catalyst may be applied on the outer surface of such a net. For example, reduction catalyst may be applied on the first catalyst substrate 121, and oxidation catalyst may be applied on the second catalyst substrate 123. The reduction catalyst may be platinum or rhodium to reduce a nitrogen oxide in the exhaust gas g1, or the oxidation catalyst may be platinum or palladium to reduce a carbon monoxide in the exhaust gas g1. Additionally, cerium may be further used as catalyst.

The support members 122 and 124 may support the catalyst substrates 121 and 123 to stably fix the catalyst substrates 121 and 123 within the housing 120a. The support members 122 and 124 may be implemented with a mat. Additionally, the support members 122 and 124 may be implemented with an intumescent mat that expands at high temperature, or with a non-intumescent mat that does not expand even at high temperature. The intumescent mat may be made of an alumina-silica ceramic fiber, vermiculite, and an organic binder and the non-intumescent mat may be made of an alumina fiber and an organic binder.

Figure 5:
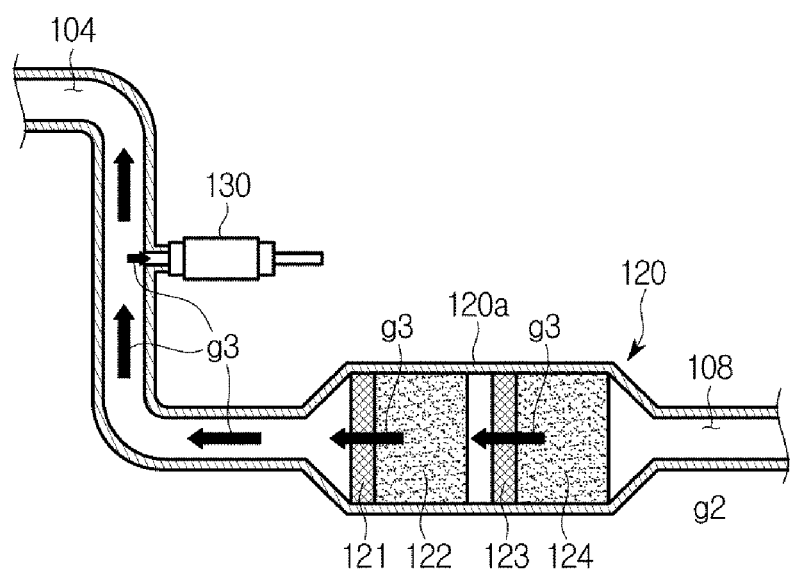
FIG. 5 is a view for describing an example of a process in which combustion gas is generated in the catalytic converter, and the first sensing unit outputs an electrical signal according to the combustion gas according to an exemplary embodiment of the present disclosure.

FIG. 5 is a view illustrating an example of a process in which combustion gas is generated in the catalytic converter 120, and the first sensing unit 130 outputs an electrical signal according to the combustion gas. The organic binder may be degraded at high temperature, and emit combustion gas g3 when it is degraded. In other words, when the inside of the catalytic converter 120 becomes a high-temperature state, the organic binder may be combusted thus causing combustion gas g3 to be generated and emitted in the support members 122 and 124 of the catalytic converter 120. The generated combustion gas g3 may contain, for example, hydrocarbon (HC) gas. When the vehicle 10 is driven by the motor 101 while the engine 102 is not operated, no exhaust gas may be emitted from the engine 102, and accordingly, the combustion gas g3 generated from the catalytic converter 120 may move to the first exhaust pipe 104, instead of the second exhaust pipe 108, as shown in FIG. 5.

The combustion gas g3 flowing to the first exhaust pipe 104 may be sensed by the first sensing unit 130, and when a substantial amount of the combustion gas g3 flows to the first exhaust pipe 104, the first sensing unit 130 may be configured to output an electrical signal of a voltage that is less than the error determination threshold value TH1 (at $t_e$), as shown in FIG. 4. In other words, the first sensing unit 130 may be configured to output an electrical signal of a voltage that is less than the error determination threshold value TH1, according to the combustion gas g3 generated from the organic binder of the support members 122 and 124, even when no error is generated in the engine 102 and/or the first sensing unit 130.

Particularly, the controller 100 may be configured to operate the engine 102 to emit the exhaust gas g1 to remove the combustion gas g3 from the first exhaust pipe 104 and/or the catalytic converter 120 together with the exhaust gas g1. According to the operation of the controller 100, the first sensing unit 130 may be prevented from outputting an electrical signal of a voltage that is less than the error determination threshold value TH1, due to the combustion gas g3, the controller 100 may be prevented from incorrectly determining that an error was generated in the engine 102 and/or the first sensing unit 130, or the instrument panel or the display unit may be prevented from outputting an error signal based on the incorrect determination of the controller 100. This will be described in detail, later.

Figure 6:
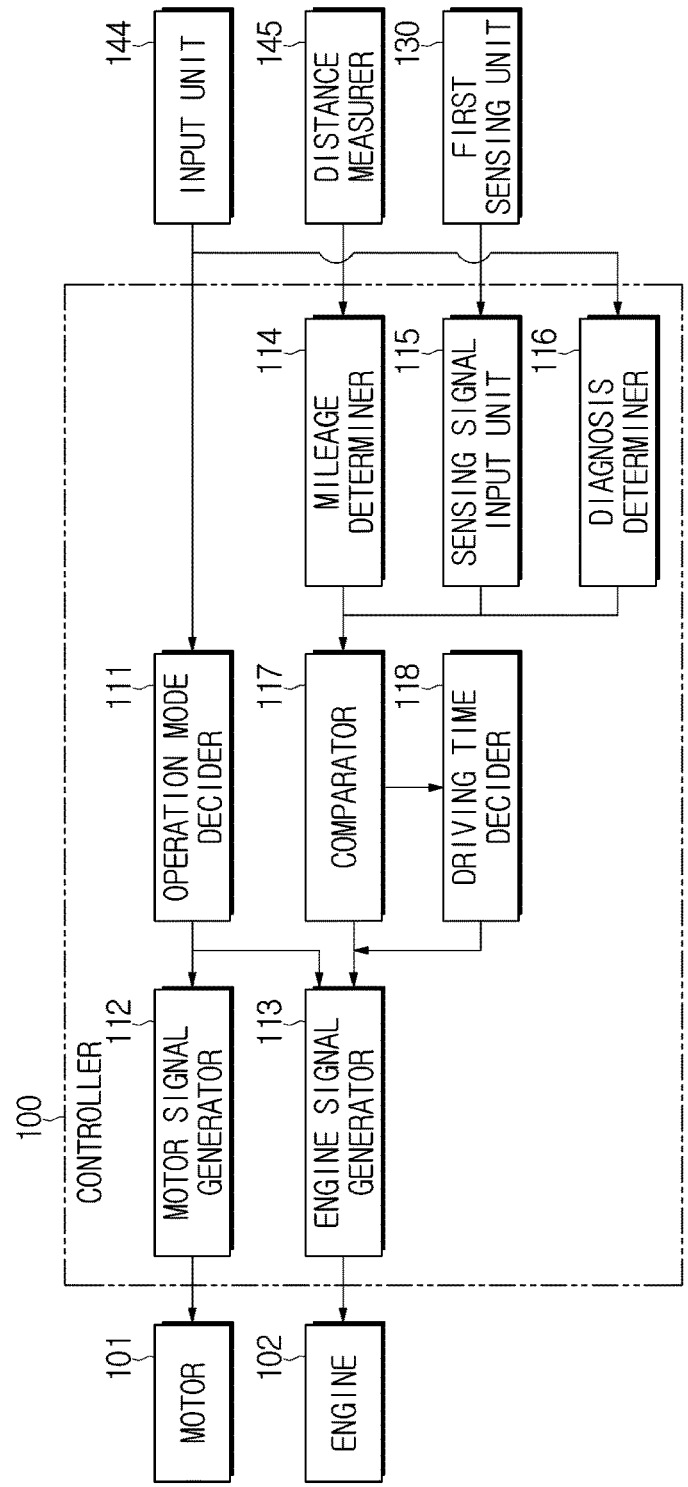
FIG. 6 is a block diagram of the controller according to an exemplary embodiment of the present disclosure.

Hereinafter, operations of the controller 100 will be described in more detail. FIG. 6 is a block diagram of the controller 100 according to an exemplary embodiment of the present disclosure. Referring to FIG. 6, the controller 100 may include an operation mode decider 111, a motor signal generator 112, an engine signal generator 113, a mileage determiner 114, a sensing signal input unit 115, a diagnosis determiner 116, a comparator 117, and a driving time decider 118.

The operation mode decider 111, the motor signal generator 112, the engine signal generator 113, the mileage determiner 114, the sensing signal input unit 115, the diagnosis determiner 116, the comparator 117, and the driving time decider 118 may be physically or logically separated from each other. When the operation mode decider 111, the motor signal generator 112, the engine signal generator 113, the mileage determiner 114, the sensing signal input unit 115, the diagnosis determiner 116, the comparator 117, and the driving time decider 118 are logically separated from each other, the operation mode decider 111, the motor signal generator 112, the engine signal generator 113, the mileage determiner 114, the sensing signal input unit 115, the diagnosis determiner 116, the comparator 117, and the driving time decider 118 may be implemented using at least one semiconductor chip and related components. Some of the operation mode decider 111, the motor signal generator 112, the engine signal generator 113, the mileage determiner 114, the sensing signal input unit 115, the diagnosis determiner 116, the comparator 117, and the driving time decider 118 may be omitted as necessary.

In particular, the operation mode decider 111 may be configured to determine an operation mode of the vehicle 10. Operation modes of the vehicle 10 may indicate a group of operations of the vehicle 10, programmed and defined in advance. For example, the operations modes of the vehicle 10 may include a normal driving mode in which the vehicle 10 is driven by the engine 102, and an electric vehicle (EV) mode in which the vehicle 10 is driven by the motor 101. The operation modes of the vehicle 10 may include an ISG mode, or an eco mode for improving fuel efficiency.

According to an exemplary embodiment, the operation mode decider 11 may be configured to determine which driving device (e.g., the motor 101 and/or the engine 102) generates a driving force for driving the vehicle 10, based on a user command input through the input unit 144 and/or a predetermined setting. More specifically, the operation mode decider 111 may be configured to determine whether the vehicle 10 is to operate using electrical energy or combustion energy of fuels, and transfer the determination result to the motor signal generator 112 or the engine signal generator 113. For example, when the operation mode of the vehicle 10 is set to an EV mode, the operation mode decider 111 may be configured to transfer a control signal to the motor signal generator 112 to operate the motor 101, while transmitting no control signal to the engine signal generator 113 or transmitting a control signal for stopping the engine 102 to the engine signal generator 113 not to operate the engine 102.

The input unit 144 may be one of various types of input means that are installed within the vehicle 10 and that may be manipulated by a driver or a passenger. The input means may include, for example, a physical button, a knob, a touch screen, a touch pad, an operating stick, various types of sensors, and/or various input devices capable of being considered by a designer, provided in a steering wheel, a dashboard, a center fascia, etc. The driver or the passenger may manipulate the input unit 144 to input a user command for causing the vehicle 10 to operate in a predetermined mode, for example, the normal driving mode or the EV mode.

Additionally, the predetermined setting may include a mileage of the vehicle 10, speed of the vehicle 10, electrical energy of a capacitor, remaining fuel, whether the vehicle 10 stops, and/or whether various conditions which may be considered by the designer are satisfied. When a predetermined condition is satisfied according to the predetermined setting, the operation mode decider 111 of the vehicle 10 may be configured to automatically determine an operation mode of the vehicle 10.

The motor signal generator 112 may be configured to generate a control signal related to operation of the motor 101 based on the determination result by the operation mode decider 111, and transfer the control signal to the motor 101 and/or components (e.g., a switch (not shown) for connecting the motor 101 to a power supply) related to operations of the motor 101. The motor 101 may be configured to start operating and/or operate at predetermined rotation speed, based on the control signal.

The engine signal generator 113 may be configured to generate a control signal related to operations of the engine 102 based on the determination result by the operation mode decider 111, and transfer the control signal to the engine 102 and/or various types of components related to operations of the engine 102. For example, the engine signal generator 113 may be configured to transfer the control signal to the ignition plug or the ignition coil of the engine 102. Accordingly, the engine 102 may be configured to start operating, and/or operate at predetermined revolution per minute (RPM), based on the control signal.

The mileage determiner 114 may be configured to determine a mileage of the vehicle 10 based on a distance measured by a distance measurer 145. Herein, the mileage may include a total sum of distances that the vehicle 10 has traveled after a specific time, and the specific time may be a time when the vehicle 10 starts being driven or when the vehicle 10 is out of the shop (e.g., the mileage is reset).

The distance measurer 145 may be configured to measure and determine a mileage of the vehicle 10. For example, the distance measurer 145 may be configured to calculate a mileage of the vehicle 10 based on an electrical signal received from a velocity sensor to sense speed of the vehicle 10, may count, like an odometer, the number of rotations of the wheels to acquire a mileage of the vehicle 10 based on the count value, or may measure RPM of the wheels using an automatic braking system (ABS) sensor to acquire a mileage of the vehicle 10 based on the result of the measurement. According to an exemplary embodiment, a part of functions of the distance measurer 145, for example, the process of calculating the mileage of the vehicle 10 may be performed by another device physically separated from the controller 100, or by the controller 100.

The mileage determiner 114 may be configured to receive the measured mileage from the distance measurer 145, and transfer the received mileage to the comparator 114. Additionally, the mileage determiner 114 may be configured to receive an electrical signal output from the velocity sensor, the odometer, or the ABS sensor through the distance measurer 145, determine a mileage based on the received electrical signal, and transfer the determined mileage to the comparator 114.

The sensing signal input unit 115 may be configured to receive, in the form of an electrical signal, information regarding the exhaust gas g1 and/or the combustion gas g3 passing through the first exhaust pipe 104 from the first sensing unit 130, and transfer the received information to the comparator 117. The sensing signal input unit 115 may further be configured to convert the electrical signal received from the first sensing unit 130 into a processable format, and transfer the result of the conversion to the comparator 117. The sensing signal input unit 115 may also be configured to convert an analog electrical signal received from the first sensing unit 130 into a digital signal, and transfer the digital signal to the comparator 117.

The diagnosis determiner 116 may be configured to determine whether to diagnose an error generation in the first sensing unit 130 and/or the engine 102, based on a user command input through the input unit 144 and/or a predetermined setting. More specifically, when the input unit 144 is manipulated to input a command for diagnosing an error generation in the first sensing unit 130, or when a condition for diagnosing the generation of errors is satisfied according to a predetermined setting, the diagnosis determiner 116 may be configured to determine that the generation of errors needs to be diagnosed, and transfer the result of the determination to the comparator 117.

Figure 7:
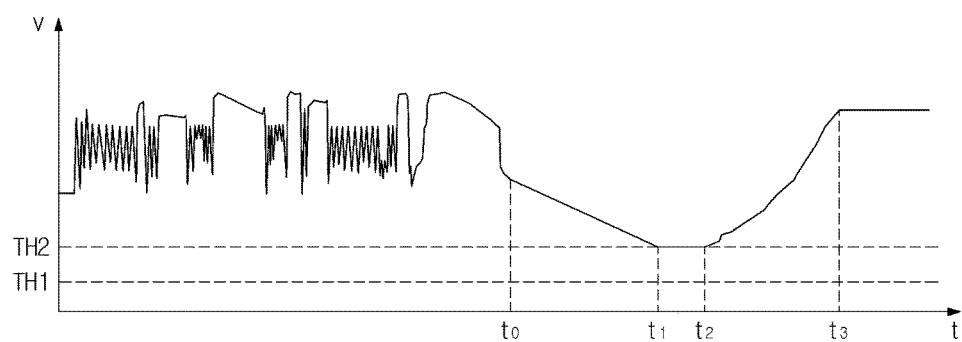
FIG. 7 is a signal diagram showing an example of changes of an electrical signal output from the first sensing unit according to an exemplary embodiment of the present disclosure.
Figure 8:
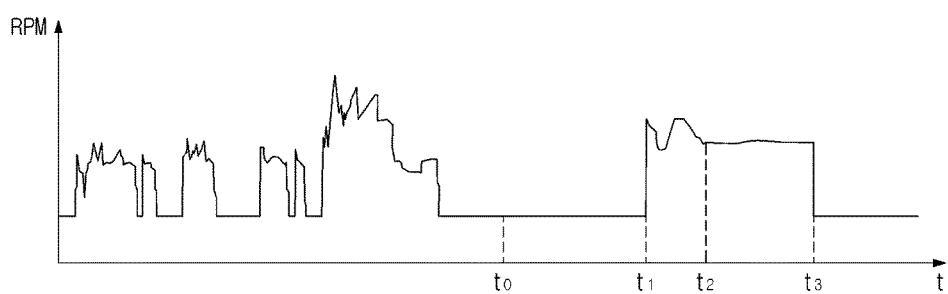
FIG. 8 is a signal diagram showing an example of changes of RPM of the engine according to an exemplary embodiment of the present disclosure.
Figure 9:
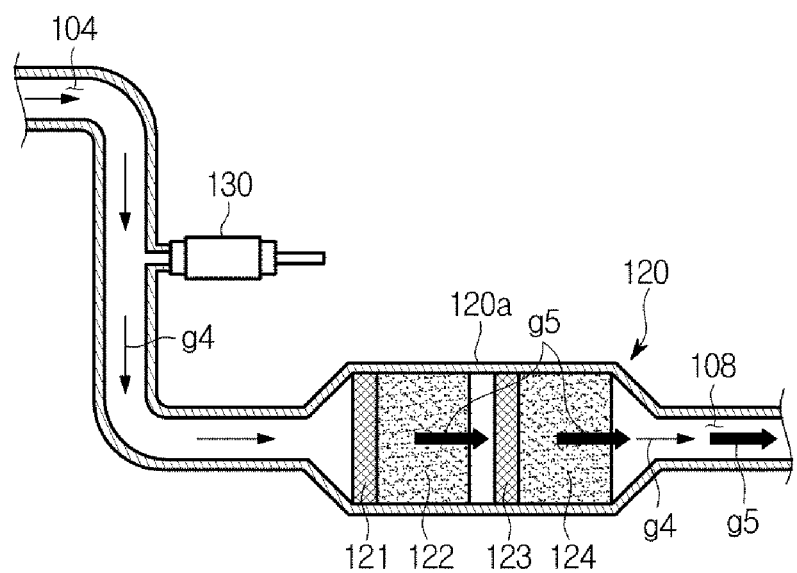
FIG. 9 is a view illustrating an example in which the catalytic converter emits combustion gas based on operation of the engine according to an exemplary embodiment of the present disclosure.

FIG. 7 is a signal diagram showing an example of changes of an electrical signal output from the first sensing unit 130, and FIG. 8 is a signal diagram showing an example of changes of RPM of the engine 102. FIG. 9 is a view for describing an example in which the catalytic converter 120 emits combustion gas according to operation of the engine 102. In FIG. 7, the x axis represents a time, and the y axis represents a voltage. In FIG. 8, the x axis represents a time, and the y axis represents RPM of the engine 102.

The comparator 117 (see FIG. 6) may be configured to compare a magnitude (e.g., a voltage) of an electrical signal received from the sensing signal input unit 115 to a first threshold value TH2, compare a mileage determined by the mileage determiner 114 to a second threshold value, and then transfer the results of the comparisons to the engine signal generator 113. More specifically, the comparator 117 may be configured to compare a mileage of the vehicle 10 measured by the distance measurer 145 and/or the mileage determiner 114 to a second threshold value, and determine whether the mileage is less than the second threshold value.

Herein, the second threshold value may be arbitrarily defined by the designer. In particular, the designer may define a mileage (or an approximate value) at which the catalytic converter 120 does not continue to generate combustion gas g3, as the second threshold value. When the vehicle 10 travels a predetermined distance or more, the organic binder of the support members 122 and 124 of the catalytic converter 120 may be all combusted, and accordingly, the support members 122 and 124 may not emit combustion gas g3. In other words, when a mileage of the vehicle 10 is equal to or greater than a predetermined value, combustion gas g3 may no longer be generated. Therefore, the designer may define the second threshold value in consideration thereof.

Additionally, when the comparator 117 determines that the mileage is less than the second threshold value, the comparator 117 may be configured to compare an electrical signal output from the first sensing unit 130 to the first threshold value TH2 to determine whether the electrical signal output from the first sensing unit 130 is equal to or less than the first threshold value TH2. As shown in FIG. 7, when the first sensing unit 130 outputs an electrical signal of a lower voltage according to inflow of combustion gas g3, the first threshold value TH2 may be set to be greater than the error determination threshold value TH1. As shown in FIG. 4, when combustion gas g3 generated from the support members 122 and 124 increases in the first exhaust pipe 104, the first sensing unit 130 may be configured to output an electrical signal of a less voltage in inverse proportion to the increase of the combustion gas g3, as shown in a time period of $t_0$ to $t_1$ of FIG. 7.

When the voltage of the electrical signal output from the first sensing unit 130 according to the increase of the combustion gas g3 is equal to the first threshold value TH2 or between the first threshold value TH2 and the error determination threshold value TH1 ($t_1$), the comparator 117 may be configured to determine that the magnitude of the electrical signal output from the first sensing unit 130 is equal to or less than the first threshold value TH2, and transfer the result of the comparison to the engine signal generator 113. The comparator 117 may further be configured to transfer the result of the comparison to the driving time decider 118 for the driving time decider 118 to determine an engine driving request time based on the comparison.

The engine signal generator 113 may be configured to generate a control signal for starting driving of the engine 102 and/or maintaining driving operation of the engine 102, in response to the comparison transferred from the comparator 117, and transfer the control signal to the engine 102. Additionally, the engine signal generator 113 may be configured to receive the engine driving request time from the driving time decider 118, and transfer the control signal to the engine 102 to allow the engine 102 to be driven for the engine driving request time. Accordingly, the engine 102 may start being driven at predetermined RPM (at $t_1$), as shown in FIG. 9. According to an exemplary embodiment, the engine 102 may continue to operate for the engine driving request time determined by the driving time decider 118, which will be described later.

As shown in FIG. 9, after driving of the engine 102 starts, the engine 102 may be configured to emit exhaust gas g4 to the first exhaust pipe 104, and the exhaust gas g4 may pass through the catalyst substrates 121 and 123 and the support members 122 and 124 of the catalytic converter 120 to move to the second exhaust pipe 108, as described above. In particular, combustion gas g5 generated from the support members 122 and 124 may move to the second exhaust pipe 108 together with the exhaust gas g4 according to the flow of the exhaust gas g4. The exhaust gas g4 and the combustion gas g5 moved to the second exhaust pipe 108 may pass through the muffler device 141 and then may be emitted to the outside through the exhaust port 142.

Accordingly, since the combustion gas g5 moves to the second exhaust pipe 108 according to the flow of the exhaust gas g4, the combustion gas g5 may not move toward the first exhaust pipe 104, and thus, the first sensing unit 130 may be configured to output no electrical signal according to sensing of the combustion gas g5. The first sensing unit 130 may thus be prevented from outputting an electrical signal of a voltage that is less than the error determination threshold value TH1, due to the combustion gas g5 entering the first exhaust pipe 104, the controller 100 may be prevented from incorrectly determining an error generation in the engine 102 and/or the first sensing unit 130, or the instrument panel or the display unit may be prevented from outputting an error signal according to the incorrect determination of the controller 100.

Figure 10:
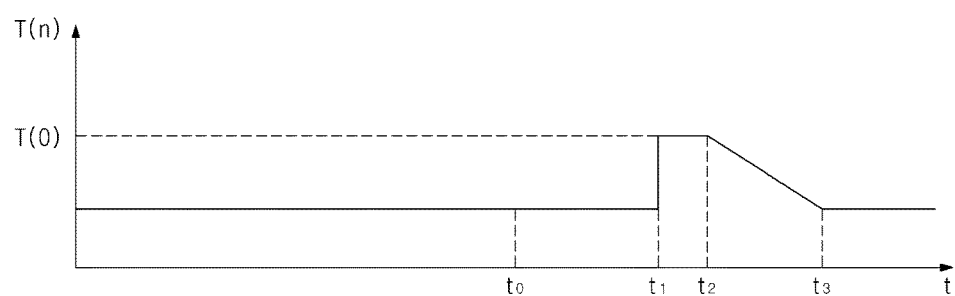
FIG. 10 is a signal diagram showing an example of changes of an engine driving request time according to an exemplary embodiment of the present disclosure.

FIG. 10 is a signal diagram showing an example of changes of an engine driving request time. In FIG. 10, the x axis represents a time, and the y axis represents a time (hereinafter, referred to as an engine driving request time) for which the engine 102 is to be driven according to a control signal.

The driving time decider 118 may be configured to determine an engine driving request time T(n) based on the determination of the comparator 117, and transfer the engine driving request time T(n) to the engine signal generator 113. The engine signal generator 113 may be configured to operate the engine 102 for the engine driving request time T(n) determined by the driving time decider 118, as described above. According to an exemplary embodiment, the driving time decider 118 may define the engine driving request time T(n) as a predetermined default value (for example, "0"), before determining the engine driving request time T(n) according to the determination of the comparator 117.

More specifically, when the result of the determination representing that the voltage of the electrical signal is equal to or less than the first threshold value TH2 and that the mileage of the vehicle is less than the second threshold value is received from the comparator 117, the driving time decider 118 may be configured to determine the engine driving request time T(n) as an initial engine driving request time T(0), and transfer the initial engine driving request time T(0) to the engine signal generator 113. The engine signal generator 113 may be configured to generate a control signal for driving the engine 102 for the initial engine driving request time T(0) determined by the driving time decider 118, and transfer the control signal to the engine 102.

Herein, the initial engine driving request time T(0) may be set to, for example, about two minutes. However, the designer may set the initial engine driving request time T(0) to an appropriate value in consideration of an appropriate time required for emitting the combustion gas g5 and generation amounts of the combustion gas g2 and g5.

After the engine 102 starts operating based on the determination by the comparator 117 and the engine driving request time T(n) (e.g., the initial engine driving request time T(0)) determined by the driving time decider 118, the comparator 117 may be configured to continue to compare a magnitude of an electrical signal to the first threshold value TH2 and compare a mileage of the vehicle 10 to the second threshold value, and the driving time decider 118 may again be configured to determine an engine driving request time T(n) based on the comparisons. The comparison operation by the comparator 117 and the decision operation of the engine driving request time T(n) by the driving time decider 118 may be performed periodically or non-periodically. More specifically, when a predetermined time period elapses after the engine 102 starts operating, the comparator 117 may be configured to compare a voltage of an electrical signal transferred from the sensing signal input unit 115 to the first threshold value TH2, and compare a mileage determined by the mileage determiner 114 to the second threshold value.

Referring to FIG. 7, for a time period between $t_1$ and $t_2$, a voltage of an electrical signal transferred from the sensing signal input unit 115 may be still equal to or less than the first threshold value TH2, and a mileage may also be less than the second threshold value. The comparator 117 may be configured to transfer the results of the comparisons to the engine signal generator 113 and the driving time decider 118.

When the voltage of the electrical signal is equal to or less than the first threshold value TH2, and the mileage is less than the second threshold value, the driving time decider 118 may be configured to set the engine driving request time T(n) to the initial engine driving request time T(0), and transfer the initial engine driving request time T(0) to the engine signal generator 113. Then, the engine signal generator 113 may be configured to generate a control signal based on a control signal related to maintenance of engine driving operation and the initial engine driving request time T(0), and then transfer the control signal to the engine 102, thereby enabling the engine 102 to continuously maintain an operation for the initial engine driving request time T(0), which is shown in FIG. 8.

When the comparator 117 determines that a voltage of an electrical signal transferred from the sensing signal input unit 115 is greater than the first threshold value TH2 and a mileage of the vehicle 10 is greater than the second threshold value, the driving time decider 118 may be configured to set the engine driving request time T(n) to a predetermined time that is less than the initial engine driving request time T(0). For example, the driving time decider 118 may be configured to set the engine driving request time T(n) to a time (y value between $t_2$ and $t_3$ in FIG. 10) resulting from subtracting a predetermined value (e.g., a predetermined time) from the initial engine driving request time T(0). Herein, the predetermined value may be a value set to sufficiently emit exhaust gas g4 and/or combustion gas g5 remaining in the first exhaust pipe 104 or the catalytic converter 120, while preventing the engine 102 from suddenly stopping. For example, the predetermined value may be 1 second, 1.001 seconds, or its approximate value. The newly set engine driving request time T(n) may be transferred to the engine signal generator 113, and the engine signal generator 113 may be configured to generate a control signal for operating the engine 102 for the engine driving request time T(n) that is less than the initial engine driving request time T(0).

After the engine 102 operates for the engine driving request time T(n) set to be less than the initial engine driving request time T(0), the driving time decider 118 may be configured to receive the results of determination by the comparator 117 indicating that a voltage of an electrical signal transferred from the sensing signal input unit 115 is greater than the first threshold value TH2 or a mileage of the vehicle 10 is greater than the second threshold value. In particular, the driving time decider 118 may be configured to set the engine driving request time T(n) to a time that is less than the previously set engine driving request time T(n). In the same manner as described above, the driving time decider 118 may again be configured to set a time resulting from subtracting a predetermined value from the previously set engine driving request time T(n), to the engine driving request time T(n).

The driving time decider 118 may be configured to transfer the newly set engine driving request time T(n) to the engine signal generator 113. The engine signal generator 113 may be configured to generate a control signal for operating the engine 102 for the newly set engine driving request time T(n) that is less than the previously set engine driving request time T(n). Accordingly, when the voltage of the electrical signal transferred from the sensing signal input unit 115 is greater than the first threshold value TH2, or when the mileage of the vehicle 10 is greater than the second threshold value, a time resulting from subtracting a predetermined value from the previously set engine driving request time T(n) may be newly set to the engine driving request time T(n), and in this case, the engine driving request time T(n) may change in the form of a linear straight line (e.g., a time period between $t_2$ and $t_3$), as shown in FIG. 10.

According to an exemplary embodiment, when the newly set engine driving request time T(n) is equal to or less than zero, the driving time decider 118 may be configured to transfer the engine driving request time T(n) that is equal to or less than zero to the engine signal generator 113. The engine signal generator 113 may be configured to generate a control signal for stopping the engine 102 according to the engine driving request time T(n) that is equal to or less than zero, and transfer the control signal to the engine 102. Accordingly, the engine 102 may stop to prevent exhaust gas g4 from being emitted from the engine 102 (after $t_3$). When the engine 102 stops, the vehicle 10 may be configured to acquire power required for driving from the motor 101.

According to another exemplary embodiment, when the newly set engine driving request time T(n) is equal to or less than zero, the driving time decider 118 may be configured to transfer a signal for stopping the engine 102 to the engine signal generator 113. The engine signal generator 113 may be configured to generate a control signal for stopping the engine 102 according to the received signal, and transfer the control signal to the engine 102.

Further, the first sensing unit 130 may be configured to output a greater voltage of an electrical signal in proportion to an increase of exhaust gas g1 or g5. In particular, when the results of determinations by the comparator 117 representing that the voltage of the electrical signal is equal to or greater than the first threshold value TH2 and that the mileage of the vehicle 10 is smaller than the second threshold value are received, the driving time decider 118 may be configured to determine the engine driving request time T(n) in the same manner as described above.

According to an exemplary embodiment, the comparator 117 and the driving time decider 118 may be configured to perform the comparison operation and the decision operation of the engine driving request time T(n) as described above, based on the determination received from the diagnosis determiner 116. More specifically, when the diagnosis determiner 116 determines that the generation of errors needs to be diagnosed, the comparator 117 and the driving time decider 118 may be configured to perform the comparison operation and the decision operation of the engine driving request time T(n) as described above, respectively, whereas when the diagnosis determiner 116 determines that the generation of errors does not need to be diagnosed, the comparator 117 and the driving time decider 118 may be configured to perform neither the comparison operation nor the decision operation of the engine driving request time T(n).

Figure 11:
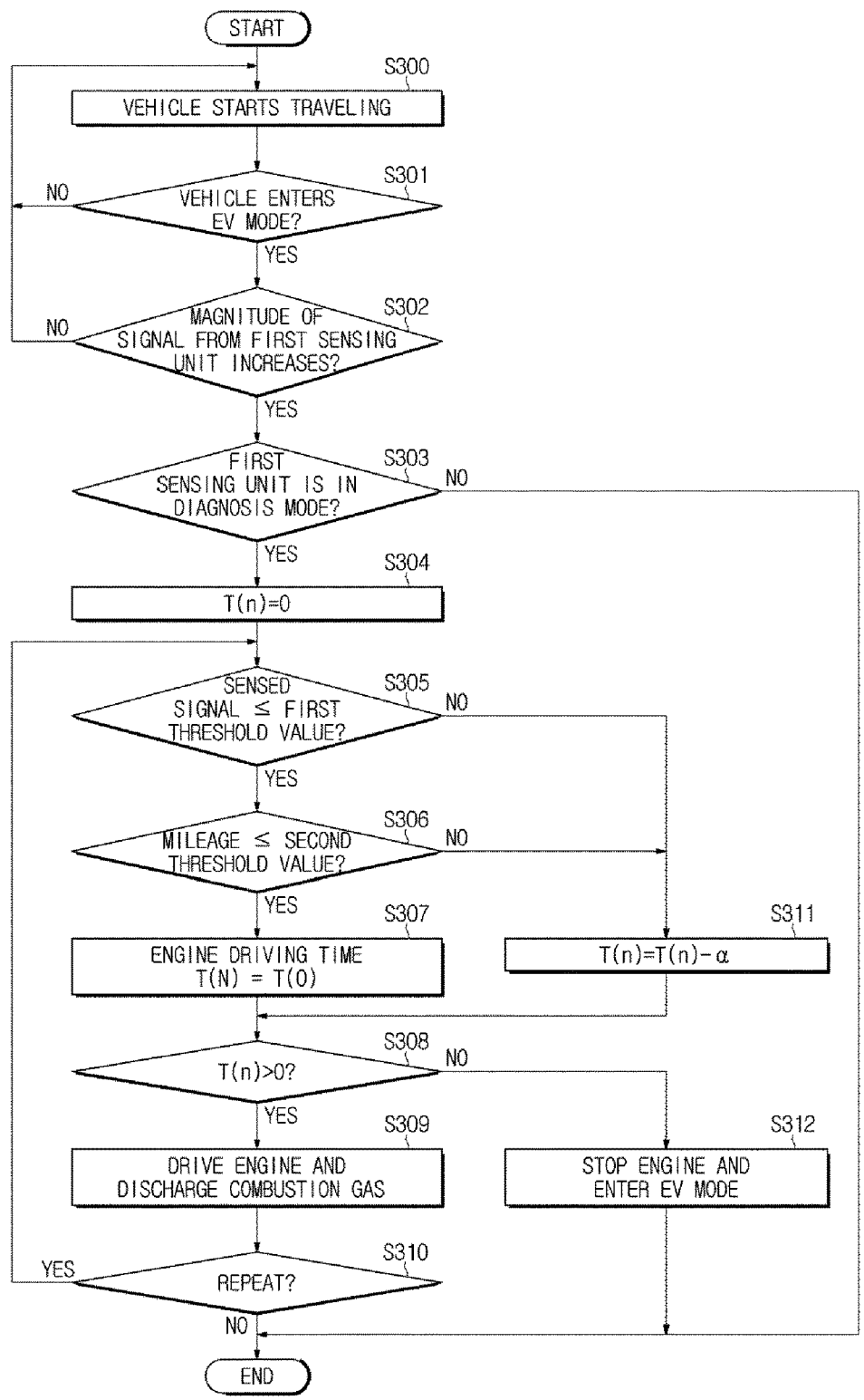
FIG. 11 is a flow chart showing a method for controlling a vehicle according to an exemplary embodiment of the present disclosure.

Hereinafter, an exemplary embodiment of a method of controlling a vehicle will be described with reference to FIG. 11. The method described herein below may be executed by a controller having a processor and a memory. FIG. 11 is a flow chart showing a method for controlling a vehicle. Referring to FIG. 11, a vehicle may start traveling, in operation S300, and enter an EV mode according to a predetermined setting and/or a user's selection, ("Yes" in operation S301). When the vehicle enters the EV mode, an engine of the vehicle may stop, and a motor may start operating to allow the vehicle to acquire power required for driving only from the motor.

When the vehicle operates in the EV mode, a first sensing unit (e.g., a first sensor) installed in a first exhaust pipe of the engine may be configured to sense exhaust gas and/or combustion gas in the first exhaust pipe, and output an electrical signal that corresponds to the sensed result, in operation S302. When a magnitude (e.g., a voltage) of an electrical signal output from the first sensing unit increases ("Yes" in operation S302), the vehicle may be configured to determine whether the first sensing unit needs to diagnose the generation of errors, in operation S303.

When the vehicle has set the first sensing unit not to diagnose the generation of errors ("No" in operation S303), operations S304 to S312 which will be described below may be not performed. When the vehicle has set the first sensing unit to diagnose the generation of errors ("Yes" in operation S303), the vehicle may be configured to determine whether the magnitude of the sensed signal is equal to or less than a first threshold value, in operation S305, and whether a mileage of the vehicle is equal to or less than a second threshold value, in operation S306.

Additionally, before the vehicle compares the magnitude of the sensed signal to the first threshold value and the mileage to the second threshold value, an engine driving request time T(n) may be set to zero, in operation S304. In FIG. 11, a case in which operation S304 of setting the engine driving request time T(n) to zero may be performed after operation S303 of determining whether to perform diagnosis in the first sensing unit is shown. However, according to another exemplary embodiment, operation S304 of setting the engine driving request time T(n) to zero may be performed before and/or after any one of operations S300 to S303.

The vehicle may be configured to determine whether the magnitude of the sensed signal is equal to or less than the first threshold value, in operation S305. When the vehicle determines that the magnitude of the sensed signal is equal to or less than the first threshold value ("Yes" in operation S305), the vehicle may be configured to determine whether the mileage is equal to or less than the second threshold value, in operation S306. When the vehicle determines that the mileage is equal to or less than the second threshold value ("Yes" in operation S306), the vehicle may be configured to set the engine driving request time T(n) to an initial engine driving request time T(0), in operation S307.

Successively, the vehicle may be configured to determine whether the set engine driving request time T(n), for example, the initial engine driving request time T(0) is greater than zero, in operation S308. When the vehicle determines that the engine driving request time T(n) is greater than zero ("Yes" in operation S308), the vehicle may be configured to drive the engine to discharge exhaust gas to the first exhaust pipe, in operation S309. The exhaust gas may be emitted to the outside through the first exhaust pipe, a catalytic converter, a second exhaust pipe, and an exhaust port. In particular, combustion gas generated in the catalytic converter may be also emitted to the outside, together with the exhaust gas, through the second exhaust pipe and the exhaust port.

After the engine is driven and the exhaust gas and the combustion gas are emitted in operation S309, operation S305 of comparing a magnitude of a sensed signal to the first threshold value and operation S306 of comparing a mileage to the second threshold value may be repeatedly performed periodically or non-periodically, in operation S310. When the magnitude of the sensed signal is still equal to or greater than the first threshold value ("Yes" in operation S305) and the mileage is still equal to or greater than the second threshold value ("Yes" in operation S306) when operation S305 and operation S306 are repeatedly performed, the vehicle may be configured to set the engine driving request time T(n) to the initial engine driving request time T(n), as described above, in operation S307. When the engine driving request time T(n) is greater than zero ("Yes" in operation S308), the vehicle may be configured to operate the engine to be continuously driven, in operation S309. Accordingly, the engine may be configured to continuously emit exhaust gas to also emit combustion gas to the outside together with the exhaust gas emitted from the engine.

When the magnitude of the sensed signal is greater than the first threshold value ("No" in operation S305), or when the mileage is greater than the second threshold value ("No" in operation S306), the vehicle may subtract a predetermined value α (α>0) from the previously set engine driving request time T(n), and newly determine an engine driving request time T(n), in operation S311. For example, when the engine driving request time T(n) has been set to zero, in operation S304, the vehicle may be configured to set the engine driving request time T(n) to "−α". According to another example, when the engine driving request time T(n) has been set to the initial engine driving request time T(0), the vehicle may set the engine driving request time T(n) to "initial engine driving request time T(0)−α".

The vehicle may be configured to determine whether the engine driving request time T(n) set in operation S311 is greater than zero, in operation S308. When the vehicle determines that the engine driving request time T(n) is greater than zero ("Yes" in operation S308), the vehicle may be configured to maintain driving of the engine to continuously discharge exhaust gas to the first exhaust pipe, in operation S309.

In contrast, when the vehicle determines that the set engine driving request time T(n) is equal to or less than zero ("No" in operation S308), the vehicle may be configured to stop driving of the engine, and again enter the EV mode, in operation S312. Accordingly, the vehicle may be driven by the motor. For example, operation S305 of comparing the magnitude of the sensed signal to the first threshold value and operation S306 of comparing the mileage to the second threshold value may be first performed, and when the magnitude of the sensed signal is greater than the first threshold value ("No" in operation S305) or when the mileage is greater than the second threshold value ("No" in operation S306), the engine driving request time T(n) may be set to "−α". In particular, since the engine driving request time T(n) is less than zero, the vehicle may be configured to stop driving of the engine, and maintain operations based on the EV mode, in operation S312.

According to another example, after operation of comparing a magnitude of a sensed signal and operation of comparing a mileage are repeatedly performed (operations S305, S306, and S310), and then a predetermined value α is repeatedly subtracted n times from the initial engine driving request time T(0) (operations S310 and S311), the engine driving request time T(n) may become less than zero ("No" in operation S308). In particular, the engine which has been started being driven in operation S309 may stop, and the vehicle may be driven again by the motor, in operation S312.

In FIG. 11, a case in which operation S305 of determining whether the magnitude of the sensed signal is equal to or less than the first threshold value is performed earlier than operation S306 of determining whether the mileage is equal to or less than the second threshold value is shown, however, according to another exemplary embodiment, operation S306 of determining whether the mileage is equal to or less than the second threshold value may be performed earlier than operation S305 of determining whether the magnitude of the sensed signal is equal to or less than the first threshold value.

According to the vehicle and the method of controlling the vehicle, gas generated by combustion in the inside of the catalytic converter may be prevented from being transferred to the front oxygen sensor installed in front of the catalytic converter to prevent the front oxygen sensor from incorrectly outputting an electrical signal. According to the vehicle and the method of controlling the vehicle, unnecessary gas generated from the catalyst of the catalytic converter may be rapidly emitted to the outside, and accordingly, a signal output from the front oxygen sensor may be prevented from being diagnosed as an error.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle, comprising:
an engine;
a motor configured to acquire a driving force of the vehicle from electrical energy;
a catalytic converter including catalyst for purifying exhaust gas discharged from the engine;
a sensor disposed between the engine and the catalytic converter, and configured to output an electrical signal in response to sensing gas; and
a controller configured to:
start the motor and stop the engine, and
restart the engine based on the electrical signal output from the sensor when a mileage of the vehicle exceeds a predetermined distance,
wherein the mileage of the vehicle includes a total sum of distances that the vehicle has traveled after a specific time,
wherein the specific time includes a time when the vehicle starts being driven or when the mileage of the vehicle is reset,
wherein the engine starts operating based on an operation of the controller, discharges the exhaust gas, and transfers the exhaust gas to the catalytic converter, and the combustion gas generated in the catalytic converter is emitted to the outside by the exhaust gas,
wherein when the motor operates, the engine stops, and when the engine operates, the motor stops,
wherein when the electrical signal output from the sensor is equal to or less than a first threshold value, and the mileage of the vehicle is less than a second threshold value, the controller is configured to transfer a driving signal to the engine to start the engine, and
wherein when the electrical signal output from the sensor is greater than the first threshold value, or when the mileage of the vehicle is greater than the second threshold value, after the engine starts operating, the controller is further configured to stop the engine after the engine restarts operating when the electrical signal output from the sensor is greater than the first threshold value or when the mileage of the vehicle is greater than the second threshold value.

2. The vehicle according to claim 1, wherein the catalytic converter includes a support member configured to support the catalyst, and the support member includes an organic binder that emits combustion gas due to heat.

3. The vehicle according to claim 2, wherein the gas sensed by the sensor includes at least one gas of the exhaust gas discharged from the engine and the combustion gas emitted from the organic binder.

4. The vehicle according to claim 1, wherein when the electrical signal output from the sensor is greater than the first threshold value, or when the mileage of the vehicle is greater than the second threshold value, the controller is configured to stop the engine after a predetermined time period elapses.

5. The vehicle according to claim 4, wherein when the electrical signal output from the sensor is greater than the first threshold value, or when the mileage of the vehicle is greater than the second threshold value, the controller is configured to decrease an engine driving request time, and stop the engine when the engine driving request time is equal to or less than zero.

6. The vehicle according to claim 1, wherein when the electrical signal output from the sensor is less than a third threshold value, the controller is configured to determine an error generation, wherein the third threshold value is less than the first threshold value.

7. A method of controlling a vehicle, comprising:
starting a motor and stopping an engine;
emitting combustion gas at a catalytic converter for purifying exhaust gas discharged from the engine;
outputting an electrical signal in response to a sensor sensing of the combustion gas;
resuming operation of the engine based on the electrical signal when a mileage of the vehicle exceeds a predetermined distance,
wherein the mileage of the vehicle includes a total sum of distances that the vehicle has traveled over a specific time,
wherein the specific time includes a time when the vehicle starts being driven or when the mileage of the vehicle is reset,
wherein the resuming of the operation of the engine based on the electrical signal and the mileage of the vehicle includes starting the engine based on an operation of a controller, discharging the exhaust gas, and transferring the exhaust gas to the catalytic converter to emit the combustion gas generated in the catalytic converter to the outside by the exhaust gas, and
wherein the resuming of the operation of the engine based on the electrical signal and the mileage of the vehicle includes transferring a control signal to the engine to start the engine when the electrical signal output from the sensor is equal to or less than a first threshold value and the mileage of the vehicle is less than a second threshold value; and
stopping the engine when the electrical signal output from the sensor is greater than the first threshold value, or when the mileage of the vehicle is greater than the second threshold value, after the engine starts operating.

8. The method according to claim 7, wherein the sensor is configured to sense at least one gas of the exhaust gas discharged from the engine and the combustion gas emitted from an organic binder.

9. The method according to claim 7, wherein the stopping of the engine when the electrical signal output from the sensor is greater than the first threshold value or when the mileage of the vehicle is greater than the second threshold value after the engine starts operating includes stopping the transfer of a driving signal to the engine after a predetermined time period elapses.

10. The method according to claim 9, wherein the stopping of the engine when the electrical signal output from the sensor is greater than the first threshold value or when the mileage of the vehicle is greater than the second threshold value after the engine starts operating includes:
decreasing an engine driving request time when the electrical signal output from the sensor is greater than a first threshold or when the mileage of the vehicle is greater than the second threshold; and
stopping the transfer of a driving signal to the engine when the engine driving request time is equal to or less than zero.

11. The method according to claim 7, further comprising determining the error generation when the electrical signal output from the sensor is less than a third threshold value, wherein the third threshold value is less than the first threshold value.

12. The method according to claim 7, wherein the catalytic converter includes:
a catalyst for reducing a harmful material from the exhaust gas discharged from the engine;
an organic binder; and
a support member for supporting the catalyst,
wherein the organic binder emits the combustion gas at high temperature.

* * * * *